US011961652B2

(12) United States Patent
Ohkubo et al.

(10) Patent No.: US 11,961,652 B2
(45) Date of Patent: Apr. 16, 2024

(54) COIL COMPONENT

(71) Applicant: TDK CORPORATION, Tokyo (JP)

(72) Inventors: Hitoshi Ohkubo, Tokyo (JP); Masazumi Arata, Tokyo (JP); Kenichi Kawabata, Tokyo (JP); Atsushi Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 640 days.

(21) Appl. No.: 16/662,220

(22) Filed: Oct. 24, 2019

(65) Prior Publication Data

US 2020/0143979 A1 May 7, 2020

(30) Foreign Application Priority Data

Nov. 1, 2018 (JP) ................................ 2018-206490
Jul. 18, 2019 (JP) ................................ 2019-133002

(51) Int. Cl.

*H01F 27/36* (2006.01)
*H01F 1/20* (2006.01)
*H01F 27/28* (2006.01)
*H01F 27/29* (2006.01)
*H01F 27/32* (2006.01)

(52) U.S. Cl.

CPC ........... *H01F 27/2885* (2013.01); *H01F 1/20* (2013.01); *H01F 27/29* (2013.01); *H01F 27/32* (2013.01); *H01F 27/361* (2020.08)

(58) Field of Classification Search

CPC ........ H01F 27/2885; H01F 1/20; H01F 27/29; H01F 27/32; H01F 27/361; H01F 1/26; H01F 2017/008; H01F 2017/048; H01F 17/0013; H01F 17/04; H01F 27/36; H01F 27/292; H01F 27/022; H01F 3/08; H01F 27/363; H01F 27/366

See application file for complete search history.

(56) References Cited

U.S. PATENT DOCUMENTS 5,561,265 A * 10/1996 Livshits .................. H01L 23/08 257/659
2002/0097124 A1 7/2002 Inoue et al.
2003/0001718 A1 1/2003 Inoue et al.
2004/0207954 A1 10/2004 Inoue et al.
2004/0209120 A1 10/2004 Inoue et al.
2012/0319797 A1* 12/2012 Tamaru .................. H01P 5/184 333/112

(Continued)

FOREIGN PATENT DOCUMENTS

JP 2002-305108 A 10/2002
JP 2004-266120 A 9/2004

(Continued)

*Primary Examiner* — Mang Tin Bik Lian
(74) *Attorney, Agent, or Firm* — Oliff PLC

(57) ABSTRACT

In a coil component, a shield layer is provided after the unevenness of the surface of an element body is smoothened by the surface being covered with an insulating layer. A Cu layer of the shield layer is provided on a smooth surface, and thus a thickness variation can be suppressed and the Cu layer can be formed with a substantially uniform thickness. In the coil component, a point where the shield layer is thin or a point lacking the shield layer is unlikely to be generated and a functional degradation of the shield layer is effectively suppressed.

9 Claims, 8 Drawing Sheets

(56) References Cited

U.S. PATENT DOCUMENTS

| | | | | |
|---|---|---|---|---|
| 2014/0184374 | A1* | 7/2014 | Park | H01F 27/255 336/83 |
| 2014/0209691 | A1 | 7/2014 | Finn et al. | |
| 2016/0163444 | A1 | 6/2016 | Choi et al. | |
| 2016/0189863 | A1 | 6/2016 | Park et al. | |
| 2017/0110240 | A1 | 4/2017 | Masuda et al. | |
| 2017/0162317 | A1* | 6/2017 | Taniguchi | H01F 27/292 |
| 2018/0158783 | A1 | 6/2018 | Lin et al. | |
| 2018/0166211 | A1* | 6/2018 | Takatsuji | H02M 1/143 |
| 2019/0096563 | A1 | 3/2019 | Choi et al. | |
| 2019/0259526 | A1* | 8/2019 | Cho | H01F 27/2885 |
| 2019/0259529 | A1* | 8/2019 | Cho | H01F 17/0013 |
| 2019/0279813 | A1* | 9/2019 | Jang | H01F 27/361 |
| 2019/0304671 | A1* | 10/2019 | Yang | H01F 27/324 |
| 2019/0304672 | A1* | 10/2019 | Kang | H01F 27/292 |
| 2019/0362887 | A1* | 11/2019 | Yang | H01F 27/292 |
| 2020/0027647 | A1* | 1/2020 | Yang | H01F 17/0013 |

FOREIGN PATENT DOCUMENTS

| | | | |
|---|---|---|---|
| JP | 2016-072615 | A | 5/2016 |
| JP | 2016-122836 | A | 7/2016 |
| JP | 2017-076796 | A | 4/2017 |

* cited by examiner

COIL COMPONENT

CROSS-REFERENCE TO RELATED APPLICATIONS

This application is based upon and claims the benefit of priority from Japanese Patent Applications No. 2018-206490, filed on 1 Nov. 2018, and No. 2019-133002, filed on 18 Jul. 2019, the entire contents of which are incorporated herein by reference.

TECHNICAL FIELD

The present disclosure relates to a coil component.

BACKGROUND

In the related art, a coil component is known in which a coil is provided in an element body made of a magnetic material. Patent Literature 1 (Japanese Unexamined Patent Publication No. 2016-72615) discloses an element body having a configuration in which a coil is covered with binder powder in which metal magnetic powder is bound by binder resin.

The coil component is mounted along with various electronic components in many cases, and thus it is required that a magnetic flux adversely affecting the electronic components does not leak from the coil component. Patent Literature 2 (Japanese Unexamined Patent Publication No. 2017-76796) and Patent Literature 3 (Japanese Unexamined Patent Publication No. 2004-266120) disclose techniques for covering an element body surface with a shield layer made of a conductive material in order to suppress magnetic flux leakage from a coil component.

SUMMARY

In a case where binder powder constitutes an element body surface as in the coil component disclosed in Patent Literature 1, the element body surface is likely to become uneven due to the metal magnetic powder exposed on the surface. Accordingly, when the element body surface is covered with a shield layer, the shield layer may undergo a thickness variation.

The present disclosure provides a coil component in which a shield layer is uniform in thickness.

A coil component according to an aspect of the present disclosure includes an element body including binder powder in which metal magnetic powder is bound by binder resin and a coil embedded in the binder powder and having a pair of main surfaces facing each other in an axial direction of the coil, an insulating layer covering one of the main surfaces of the element body, and a shield layer provided on the main surface via the insulating layer.

In the coil component, the binder powder constitutes the surface of the element body, and thus unevenness is likely to arise on the surface of the element body. However, the unevenness on the element body surface is smoothened by the insulating layer covering the element body surface. Accordingly, it is possible to suppress a thickness variation of the shield layer provided on the main surface via the insulating layer.

The coil component according to another aspect further includes a pair of external electrode terminals provided on the other main surface of the element body and electrically connected to both end portions of the coil.

In the coil component according to another aspect, the element body has a rectangular parallelepiped outer shape, the insulating layer covers the main surface and four side surfaces of the element body, and the shield layer is provided on the main surface and the four side surfaces via the insulating layer. In this case, magnetic flux leakage from the coil component is further suppressed by the shield layer.

In the coil component according to another aspect, the shield layer has a multilayer structure.

In the coil component according to another aspect, the binder powder has a metal magnetic powder content of 80 to 92 vol %.

DETAILED DESCRIPTION

Figure 1:
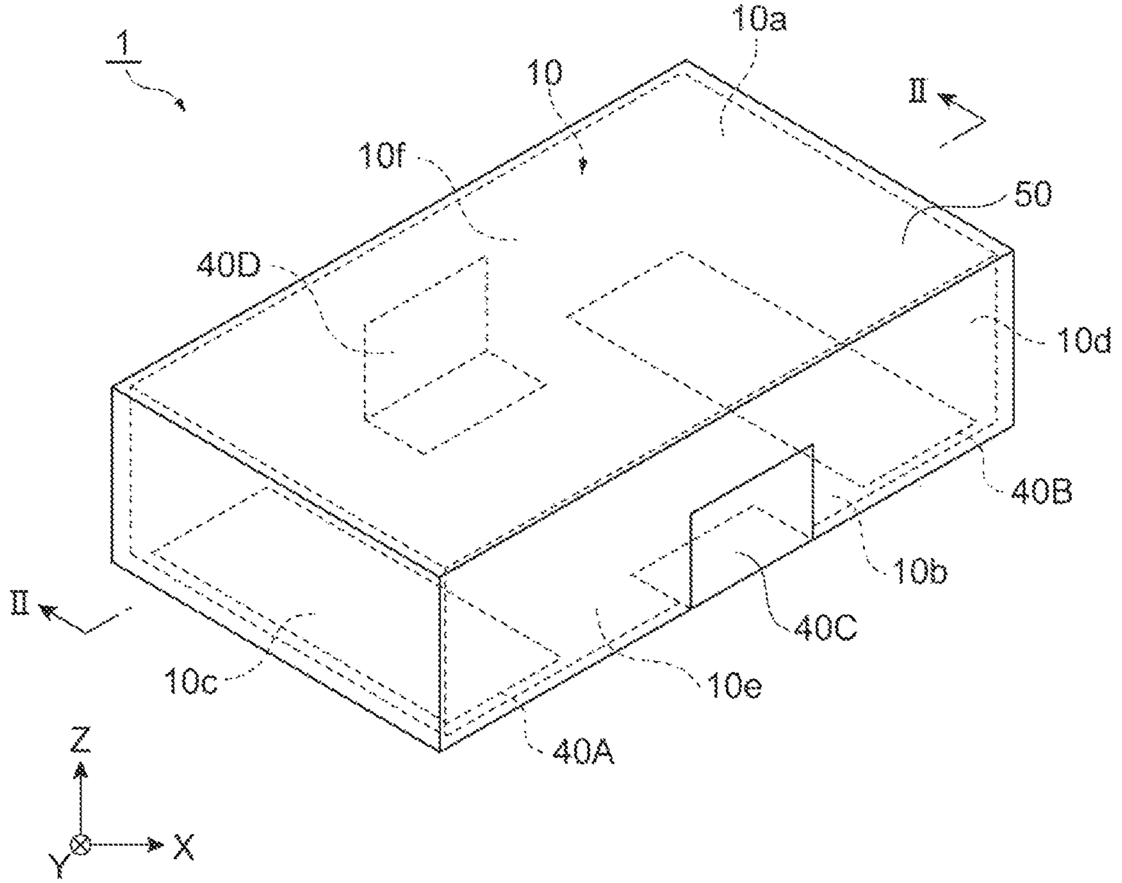
FIG. 1 is a schematic perspective view of a coil component according to an embodiment.

Hereinafter, various embodiments will be described in detail with reference to the drawings. In the drawings, the same or corresponding parts are denoted by the same reference numerals without redundant description.

Figure 2:
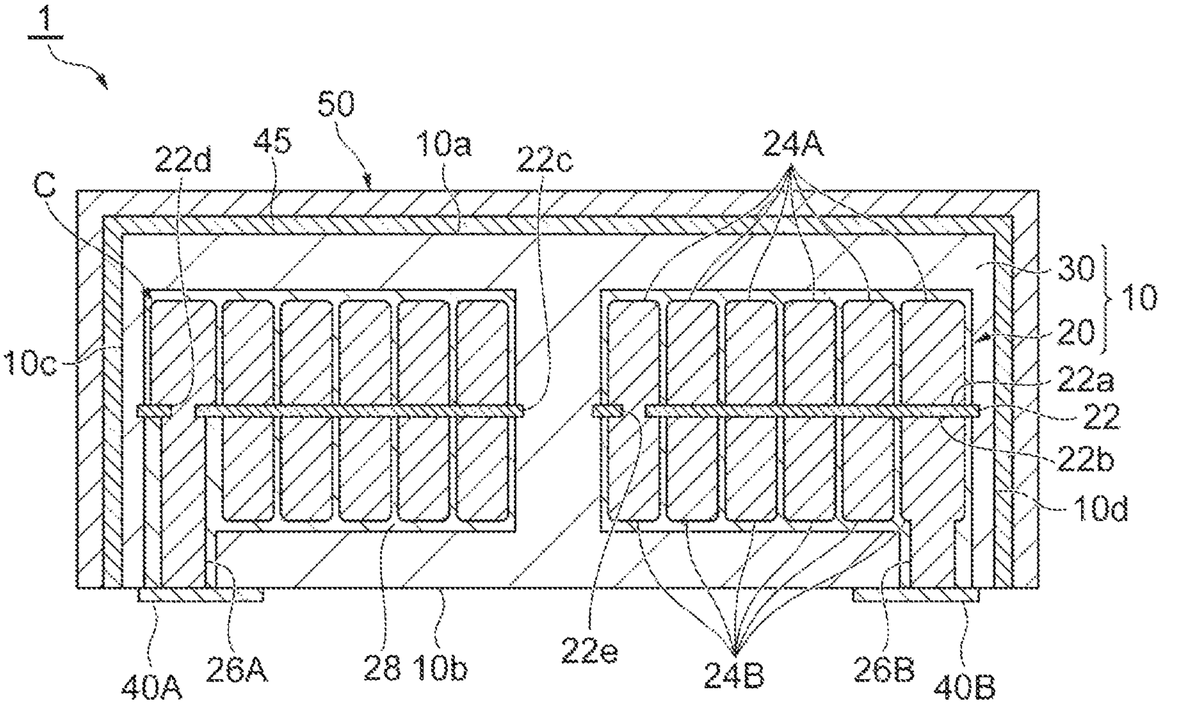
FIG. 2 is a cross-sectional view of the coil component taken along line II-II in FIG. 1.

As illustrated in FIGS. 1 and 2, a coil component 1 according to an embodiment has a rectangular parallelepiped outer shape. The coil component 1 is configured to be provided with an element body 10, a pair of external electrode terminals 40A and 40B provided on a lower surface 10*b* of the element body 10, a pair of ground electrode terminals 40C and 40D extending from the lower surface 10*b* of the element body 10 to respective side surfaces 10*d* and 10*f*, and a shield layer 50 provided on a surface 10*a*, a surface 10*c*, the surface 10*d*, a surface 10*e*, and the surface 10*f* of the element body 10 but not provided on the lower surface 10*b*. The coil component 1 is designed to have, for example, a long side of 2.0 mm, a short side of 1.6 mm, and a height of 0.9 mm in terms of dimensions.

The element body 10 has a rectangular parallelepiped outer shape and the upper surface 10*a* (one main surface) and the lower surface 10*b* (the other main surface) are parallel and face each other. The element body 10 has a coil portion 20 and a coating portion 30 and the coil portion 20 is embedded in the coating portion 30.

The coil portion 20 is provided with a coil C having an axis parallel to the up-down direction that is the direction in which the upper surface 10*a* and the lower surface 10*b* face each other.

The coil C has a substrate 22, an upper coil conductor 24A provided on an upper surface 22*a* of the substrate 22, a lower coil conductor 24B provided on a lower surface 22*b* of the substrate 22, and a pair of lead conductors 26A and 26B.

The substrate 22 has a flat plate rectangular shape and is disposed so as to be orthogonal to the up-down direction. The substrate 22 has a through hole 22*c* provided in a region corresponding to the axial center of the coil C. In addition, the substrate 22 has a through hole 22*d* at a position corresponding to the outer peripheral side end portion of the upper coil conductor 24A. Further, the substrate 22 has a through hole 22*e* at a position where the inner peripheral side end portion of the upper coil conductor 24A and the inner peripheral side end portion of the lower coil conductor 24B overlap in the edge region of the through hole 22*c*. Usable as the substrate 22 is a substrate having a plate thickness of 60 μm with a glass cloth impregnated with cyanate resin (Bismaleimide Triazine (BT) resin: registered trademark). Polyimide, aramid, and the like can also be used in addition to the BT resin. Ceramic or glass can be used as the material of the substrate 22. The material of the substrate 22 can be a mass-produced printed circuit board material, or a resin material used for a BT, FR4, or FR5 printed circuit board in particular.

The upper coil conductor 24A and the lower coil conductor 24B are planar coils provided so as to surround the through hole 22*c* of the substrate 22. In other words, the coil C has a two-stage planar coil. Each of the coil conductors 24A and 24B can be wound in, for example, a circular shape, an elliptical shape, or a quadrangular shape when viewed from the up-down direction of the element body 10. The upper coil conductor 24A and the lower coil conductor 24B are connected via the through hole 22*e* of the substrate 22. Each of the coil conductors 24A and 24B can be made of a metal material such as Cu. In the present embodiment, each of the coil conductors 24A and 24B is formed by electrolytic plating of Cu.

The pair of lead conductors 26A and 26B extend from an end portion of the coil C to the lower surface 10*b* of the element body 10. The lead conductor 26A extends from the outer peripheral side end portion of the upper coil conductor 24A to the lower surface 10*b* of the element body 10 via the through hole 22*d* on the side surface 10*c* side of the element body 10. The lead conductor 26B extends from the outer peripheral side end portion of the lower coil conductor 24B to the lower surface 10*b* of the element body 10 on the side surface 10*d* side facing the side surface 10*c*.

The coil portion 20 is provided with coating resin 28 integrally covering each of the coil conductors 24A and 24B and the lead conductors 26A and 26B constituting the coil C. The coating resin 28 electrically insulates the coil C and the coating portion 30.

The coating portion 30 integrally covers the coil portion 20 and constitutes the surfaces 10*a* to 10*f* of the element body 10. Binder powder in which metal magnetic powder is bound by binder resin constitutes the coating portion 30. An iron-nickel alloy (permalloy alloy), carbonyl iron, an amorphous, non-crystalline or crystalline FeSiCr alloy, sendust, and so on are capable of constituting the metal magnetic powder. The binder resin is, for example, a thermosetting epoxy resin. In the present embodiment, the content of the metal magnetic powder in the binder powder is 80 to 92 vol % in volume percent and 95 to 99 wt % in mass percent. From the viewpoint of magnetic properties, the content of the metal magnetic powder in the binder powder may be 85 to 92 vol % in volume percent and 97 to 99 wt % in mass percent.

Each of the pair of external electrode terminals 40A and 40B has a rectangular shape. The pair of external electrode terminals 40A and 40B are provided on the side surface 10*c* side and the side surface 10*d* side of the lower surface 10*b* of the element body 10, respectively. The external electrode terminal 40A extends along the side corresponding to the side surface 10*c* on the lower surface 10*b*. The external electrode terminal 40A is connected via the lead conductor 26A to one end portion of the coil C (that is, the outer peripheral side end portion of the upper coil conductor 24A). The external electrode terminal 40B extends along the side corresponding to the side surface 10*d* on the lower surface 10*b*. The external electrode terminal 40B is connected via the lead conductor 26B to the other end portion of the coil C (that is, the outer peripheral side end portion of the lower coil conductor 24B). Cr, Cu, Ni, Sn, Au, solder, or the like can be used for the external electrode terminals 40A and 40B. The external electrode terminals 40A and 40B may have a multilayer structure. The external electrode terminals 40A and 40B may be made of a conductive resin containing silver powder. A Ni plating layer and a Sn plating layer may be formed on the surface layers of the external electrode terminals 40A and 40B.

The pair of ground electrode terminals 40C and 40D are provided near the longitudinal middle of the element body 10. The ground electrode terminal 40C extends along the side surface 10*d* from the lower surface 10*b* of the element body 10 and is connected to a Cu layer 51 of the shield layer 50 (described later) formed on the side surface 10*d*. The ground electrode terminal 40D extends along the side surface 10*f* from the lower surface 10*b* of the element body 10 and is connected to the Cu layer 51 of the shield layer 50 (described later) formed on the side surface 10*f*. Cr, Cu, Ni, Sn, Au, solder, or the like can be used for the ground electrode terminals 40C and 40D. The ground electrode terminals 40C and 40D may have a multilayer structure. The ground electrode terminals 40C and 40D may be made of a conductive resin containing silver powder. A Ni plating layer and a Sn plating layer may be formed on the surface layers of the ground electrode terminals 40C and 40D.

The shield layer 50 is a layer for preventing the magnetic flux of the coil C from leaking to the outside of the coil component 1. The shield layer 50 has a multilayer structure (two-layer structure in the present embodiment) and is the Cu layer 51 and a permalloy layer 52 in order from the side that is close to the element body 10. The thickness of the Cu layer 51 is, for example, 0.1 to 1 μm. The thickness of the permalloy layer 52 is, for example, 0.1 to 1 μm. The thickness of the permalloy layer 52 may be in the range of 0.1 to 10 μm. The shield layer 50 is provided so as to integrally cover the surfaces 10*a*, 10*c*, 10*d*, 10*e*, and 10*f* of the element body 10 via an insulating layer 45. The insulating layer 45 is made of epoxy resin in the present embodiment. The material constituting the insulating layer 45 is not limited to epoxy resin and may be glass or the like. The thickness of the insulating layer 45 is, for example, 1 to 5 μm.

Hereinafter, a procedure for manufacturing the coil component 1 described above will be described with reference to FIGS. 3A to 3D and FIGS. 4A to 4D.

Figure 3A:
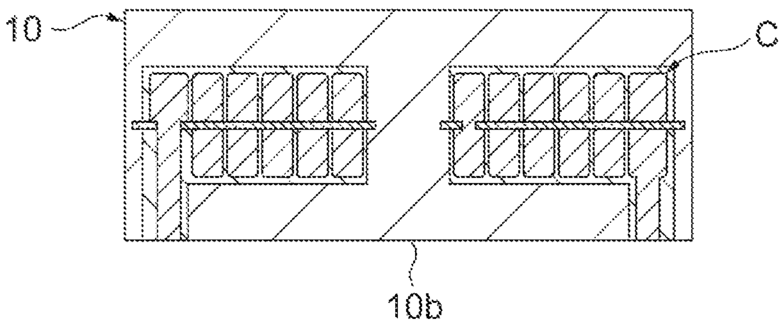
FIGS. 3A to 3D are cross-sectional views respectively illustrating processes according to a method for manufacturing the coil component illustrated in FIG. 1.
Figure 3B:
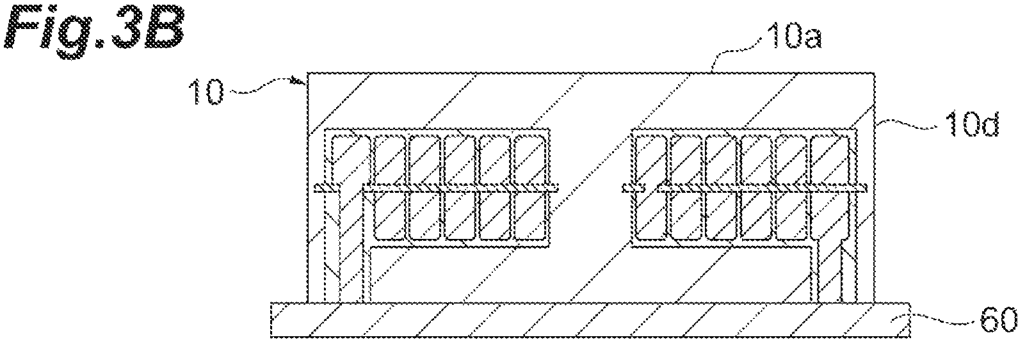
Figure 3C:
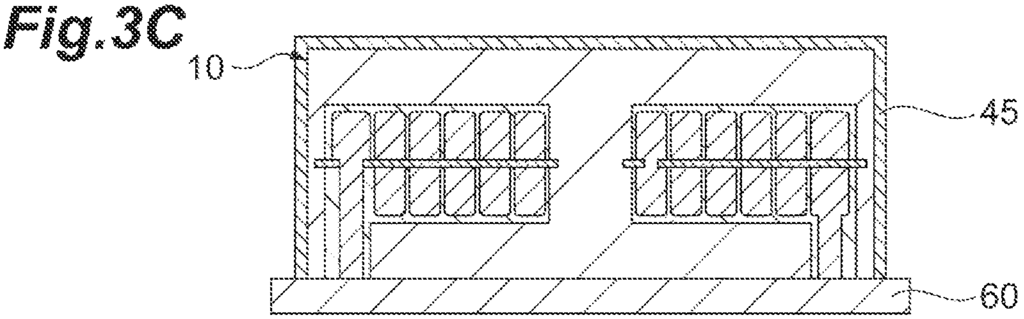
Figure 3D:
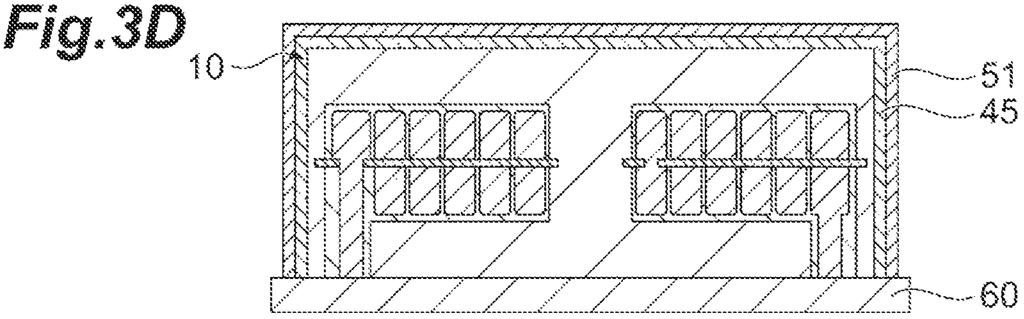

The element body 10 is prepared as illustrated in FIG. 3A when the coil component 1 is manufactured. Then, the entire lower surface 10*b* of the element body 10 is masked with a resist 60 as illustrated in FIG. 3B. Next, as illustrated in FIG. 3C, the insulating layer 45 is formed as a result of epoxy resin application to the entire surface of the element body except for the lower surface 10*b* covered with the resist 60 and curing. The epoxy resin application to the surface of the element body can be performed by, for example, printing or dipping. Subsequently, as illustrated in FIG. 3D, the Cu layer 51 is formed by the entire surface of the element body except for the lower surface 10*b* covered with the resist 60 being covered with Cu by electroless plating. A platinum catalyst is supported on the insulating layer 45 during the formation of the Cu layer 51.

Figure 4A:
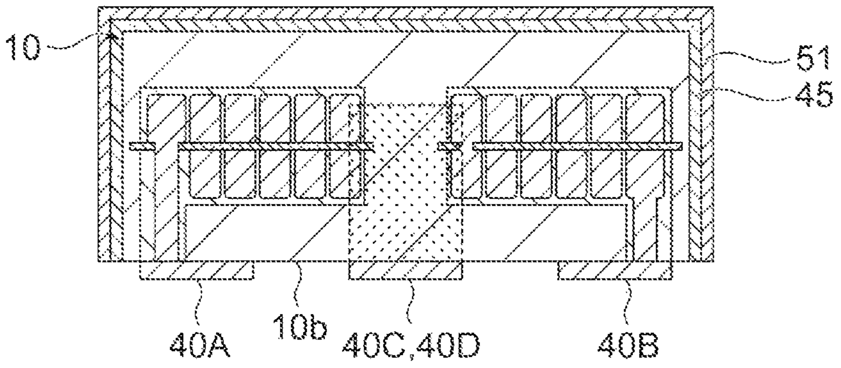
FIGS. 4A to 4D are cross-sectional views respectively illustrating processes according to the method for manufacturing the coil component illustrated in FIG. 1.
Figure 4B:
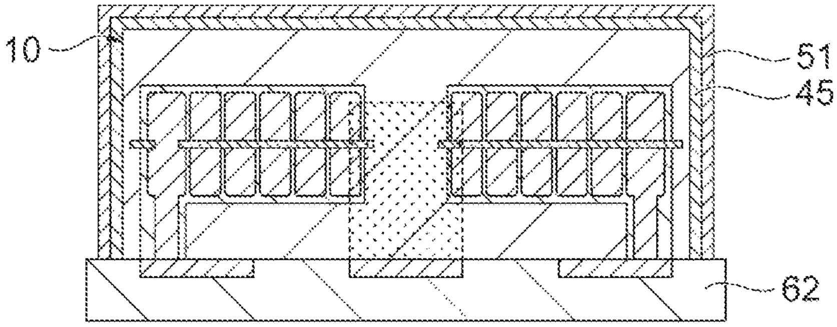

Subsequently, as illustrated in FIG. 4A, each of the external electrode terminals 40A and 40B and the ground electrode terminals 40C and 40D is formed on the lower surface 10*b* of the element body 10 after the resist 60 is removed. Subsequently, as illustrated in FIG. 4B, the entire lower surface 10*b* of the element body 10 is masked with a resist 62. At this time, each of the external electrode terminals 40A and 40 is covered with the resist 62 and each of the ground electrode terminals 40C and 40D at parts provided on the lower surface 10*b* is also covered with the resist 62.

Figure 4C:
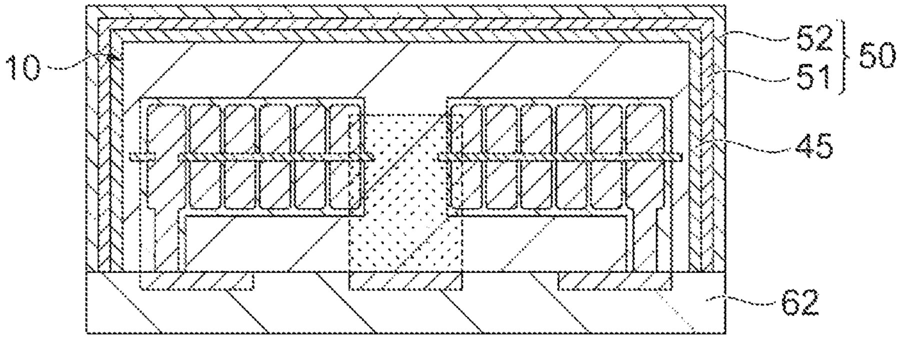
Figure 4D:
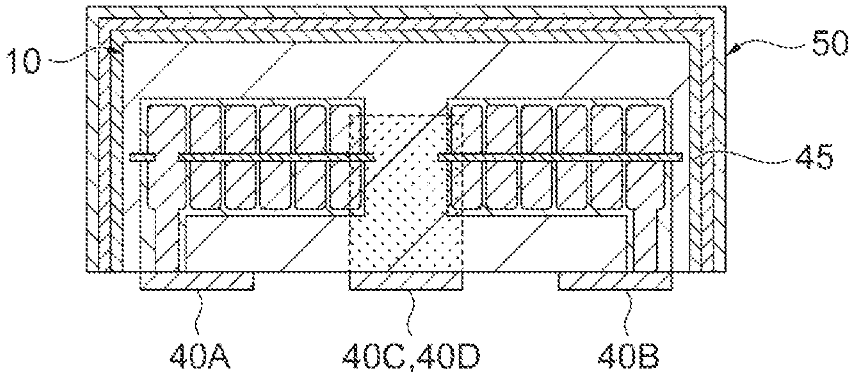

Further, as illustrated in FIG. 4C, the permalloy layer 52 is formed by the entire surface of the element body except for the lower surface 10*b* covered with the resist 62 being covered with a permalloy by electroless plating. Formed as a result is the shield layer 50 including the Cu layer 51 and the permalloy layer 52. After the shield layer 50 is formed, the resist 60 is removed as illustrated in FIG. 4D and a post process (such as plating layer formation on the surface layers of the external electrode terminals 40A and 40B and the ground electrode terminals 40C and 40D by barrel plating of Ni and Sn) is performed as necessary. The coil component 1 is completed as a result.

Figure 5:
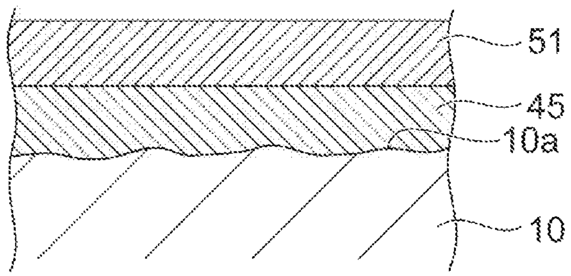
FIG. 5 is an enlarged view of a main part of the cross-sectional view of the coil component illustrated in FIG. 2.

In the coil component 1 described above, the insulating layer 45 is interposed between the Cu layer 51 and the surface of the element body 10 (such as the upper surface 10*a*) as illustrated in FIG. 5. Binder powder in which metal magnetic powder is bound by binder resin constitutes the surface of the element body 10, and thus individual metal magnetic powder shapes are likely to appear on the element body surface and unevenness is likely to arise. In a case where the surface of the element body 10 is formed by cutting or polishing, unevenness may arise on the element body surface due to detachment, cracking, or chipping of the metal magnetic powder. Unevenness is particularly likely to arise in a case where the content of metal magnetic powder in binder powder is extremely high as in the case of the binder powder according to the present embodiment. Accordingly, a thickness variation arises in the Cu layer 51 of the shield layer 50 in a case where the element body surface is directly covered with the Cu layer 51 of the shield layer 50. The function as the shield layer may be significantly degraded particularly in a case where a point where the Cu layer 51 of the shield layer 50 is reduced in thickness or a point (hole) lacking the Cu layer 51 of the shield layer 50 is generated.

In this regard, in the coil component 1, the shield layer 50 is provided after the unevenness of the surface of the element body 10 is smoothened by the surface being covered with the insulating layer 45. As a result, the Cu layer 51 of the shield layer 50 is provided on a smooth surface as illustrated in FIG. 5, and thus a thickness variation can be suppressed and the Cu layer 51 can be formed with a substantially uniform thickness. As a result, in the coil component 1, a point where the shield layer 50 is thin or a point lacking the shield layer 50 is unlikely to be generated and a functional degradation of the shield layer 50 is effectively suppressed. In addition, the insulating layer 45 suppresses a thickness variation of the shield layer 50, and thus it is possible to reduce the thickness of the shield layer 50 while suppressing hole formation.

Figure 6:
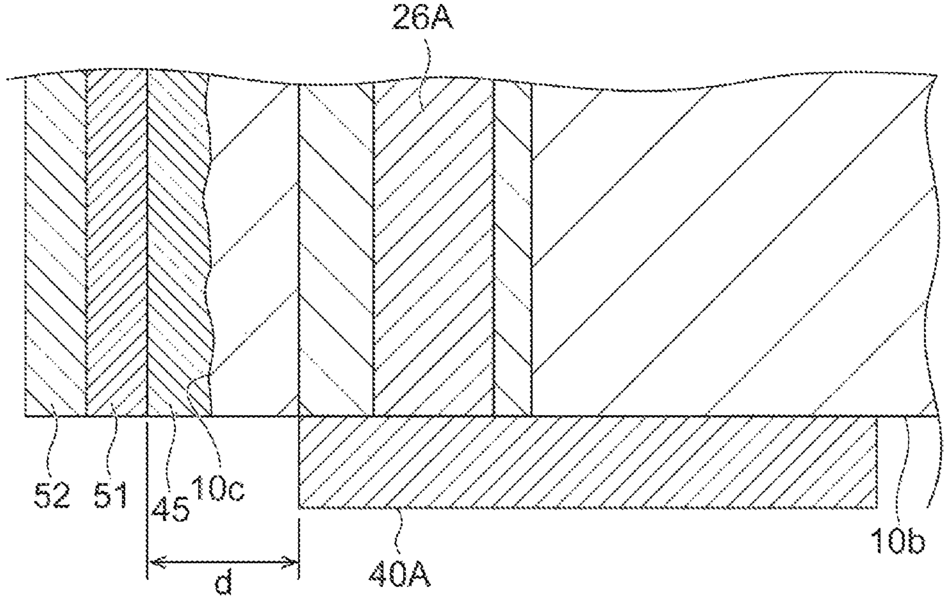
FIG. 6 is an enlarged view of a main part of the cross-sectional view of the coil component illustrated in FIG. 2.

In the coil component 1, the shield layer 50 is kept away from the surface of the element body 10 by the insulating layer 45. Accordingly, a separation distance d between the external electrode terminal 40A and the Cu layer 51 of the shield layer 50 can be sufficiently ensured even in a case where the external electrode terminal 40A is provided so as to be close to the side surface 10*c* of the element body 10 as illustrated in FIG. 6, and thus suppressed is a situation in which a short circuit occurs between the external electrode terminal 40A and the Cu layer 51 of the shield layer 50 when a high-frequency current is applied to the coil component 1. In addition, the shield layer 50 is insulated and separated from the surface of the element body 10 by the insulating layer 45, and thus suppressed is a situation in which a current attributable to a high-frequency skin effect is generated in the shield layer 50.

The present disclosure is not limited to the embodiment described above and can be changed into various forms.

For example, the shield layer 50 does not necessarily have to be provided on the surfaces 10*a*, 10*c*, 10*d*, 10*e*, and 10*f* of the element body 10 without being provided on the lower surface 10*b* and the shield layer 50 may be provided at least on the upper surface 10*a*. The upper surface 10*a* of the element body 10 is a surface orthogonal to the axis of the coil C and is particularly likely to undergo magnetic flux leakage. Accordingly, it is possible to effectively suppress magnetic flux leakage by providing the shield layer 50 on the upper surface 10*a* of the element body 10. Magnetic flux leakage from the coil component 1 is suppressed more in a case where the shield layer 50 is provided on the surfaces 10*a*, 10*c*, 10*d*, 10*e*, and 10*f* of the element body 10 than in a case where the shield layer 50 is provided only on the upper surface 10*a*.

Figure 7:
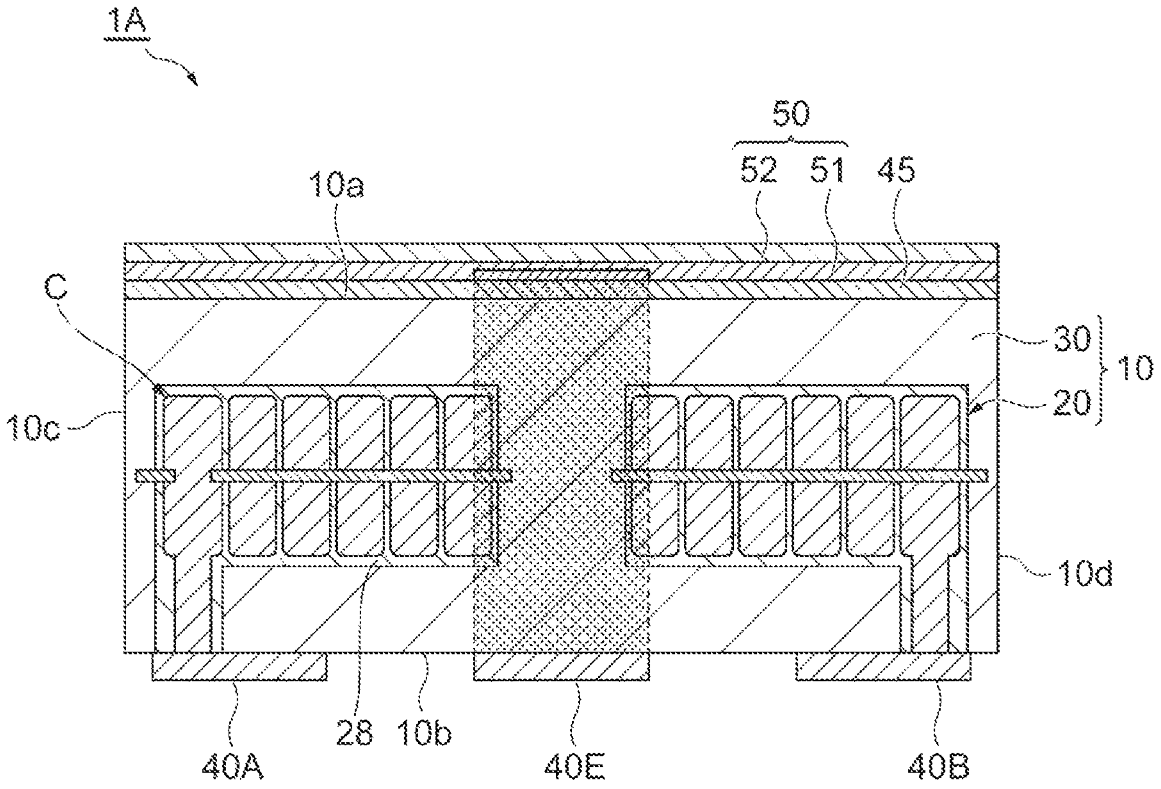
FIG. 7 is a schematic cross-sectional view illustrating a coil component according to another form.

Illustrated in FIG. 7 is a coil component 1A, in which the shield layer 50 is provided only on the upper surface 10*a* of the element body 10. In the coil component 1A, the insulating layer 45 and the shield layer 50 are provided only on the upper surface 10*a* of the element body 10 and the insulating layer 45 is interposed between the shield layer 50 and the upper surface 10*a* of the element body 10. Also in the coil component 1A, the Cu layer 51 of the shield layer 50 is provided on a surface smoothened by the insulating layer 45, and thus the Cu layer 51 can be formed with a substantially uniform thickness. A ground terminal electrode 40E of the coil component 1A extends from the lower surface 10*b* of the element body 10 to the upper surface 10*a* along the side surfaces 10*d* and 10*f* and is connected to the Cu layer 51 of the shield layer 50.

The coil C is not limited to the configuration provided with the two-stage planar coil. The number of stages of the planar coil can be increased or decreased as appropriate. The coil may be a spiral coil.

The shield layer is not limited to the two-layer structure and may have a single-layer structure or a multilayer structure having three or more layers. In a case where the shield layer has a multilayer structure, shield effect improvement is achieved as compared with a case where the shield layer has a single-layer structure. The shield layer may be made of a material higher in magnetic permeability than the binder powder constituting the coating portion of the element body. The shield layer can be made of ferrite, Ni, a Ni alloy, or the like as well as the permalloy and Cu described above.

Figure 8:
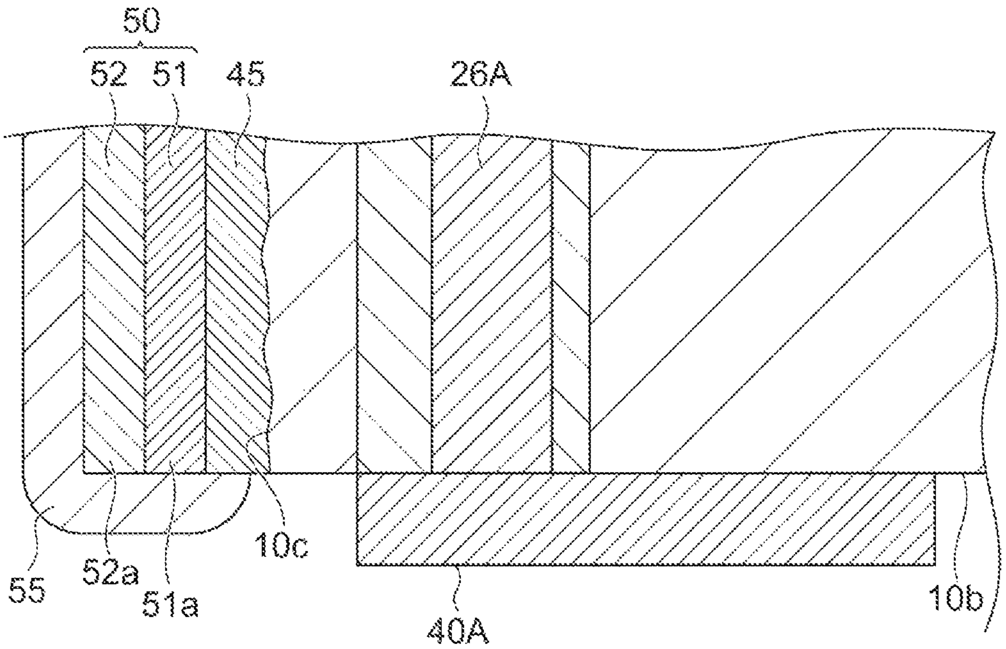
FIG. 8 is a schematic cross-sectional view illustrating a coil component according to another form.

An insulating layer made of epoxy resin or the like may be further provided on the surface of the shield layer. In this case, the coil component 1 can be insulated from the outside. The insulating layer provided on the surface of the shield layer may have a form as illustrated in FIG. 8. In other words, an insulating layer 55 provided on the surface of the shield layer 50 covers the Cu layer 51 of the shield layer 50 and end portions 51*a* and 52*a* of the permalloy layer 52 (that is, lower end portions near the element body lower surface 10*b*) and the Cu layer 51 and the permalloy layer 52 are not exposed to the outside. The material constituting the insulating layer 55 is not limited to epoxy resin and may be glass or the like. The insulating layer 55 can be designed to be smaller in thickness than the insulating layer 45 positioned inside the shield layer 50.

What is claimed is:

1. A coil component comprising:

an element body including binder powder in which metal magnetic powder is bound by binder resin and a coil embedded in the binder powder and having a pair of main surfaces facing each other in an axial direction of the coil and arising unevenness;

an insulating layer covering one of the main surfaces and four side surfaces of the element body and smoothening the unevenness;

a shield layer provided on the insulating layer;

a pair of ground electrode terminals; and a pair of external electrode terminals on the other main surface of the element body, wherein a thickness of an end part of the shield layer is equal to that of the other end part of the shield layer, the element body has a rectangular parallelepiped outer shape, the insulating layer does not cover the other main surface of the element body, in a bottom plan view, each of the external electrode terminals is separated from an outer edge of the other main surface of the element body, and the shield layer has a multi-layer structure, and a part of each ground electrode terminal of the pair of ground electrode terminals is sandwiched between layers of the multi-layer structure of the shield layer.

2. The coil component according to claim 1, wherein the pair of external electrode terminals are electrically connected to both end portions of the coil.

3. The coil component according to claim 1, wherein the binder powder has a metal magnetic powder content of 80 to 92 vol %.

4. The coil component according to claim 1, wherein each of the pair of ground electrode terminals is electrically connected to the shield layer on side surfaces of the element body.

5. The coil component according to claim 1, wherein the shield layer is formed with a substantially uniform thickness.

6. The coil component according to claim 1, where the shield layer is insulated and separated from the one of the main surfaces of the element body by the insulating layer.

7. The coil component according to claim 1, wherein an outermost portion of each of the external electrode terminals in the axial direction is positioned between an outermost portion of the coil and a side surface of the element body in the axial direction.

8. The coil component according to claim 1, wherein each of the pair of external electrode terminals is electrically connected to both end portions of the coil via lead conductors extending inside the element body.

9. The coil component according to claim 1, wherein the multi-layer structure of the shield layer comprises a first Cu layer and a second permalloy layer.

* * * * *